Dec. 4, 1962 P. BUTTINGER 3,066,446
DEVICE FOR CULTIVATING PLANTS
Filed April 23, 1959 2 Sheets-Sheet 1
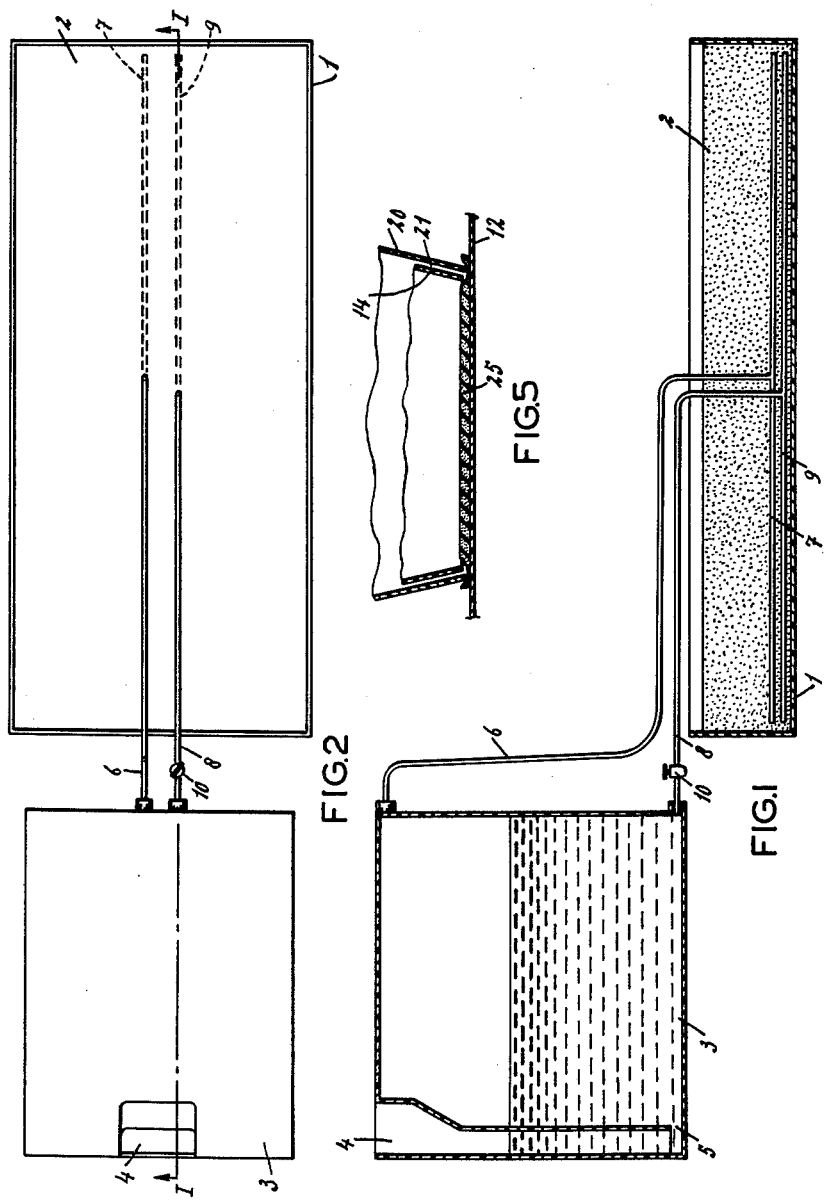

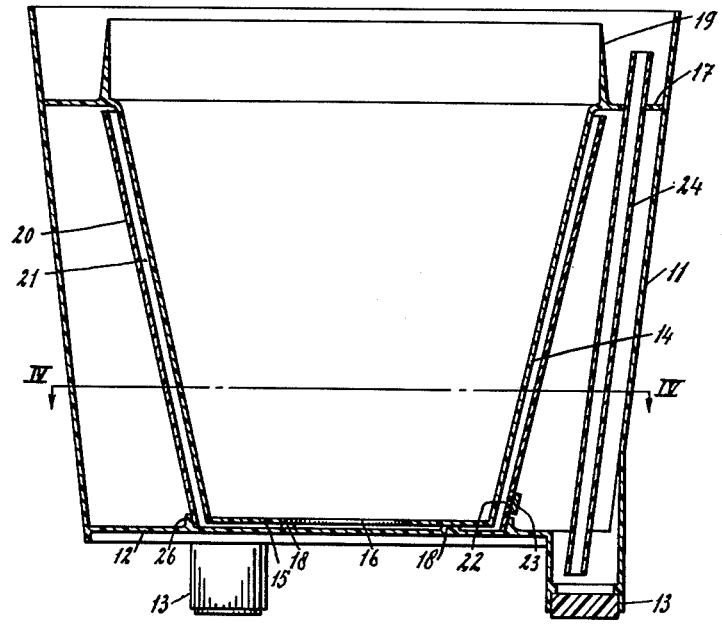
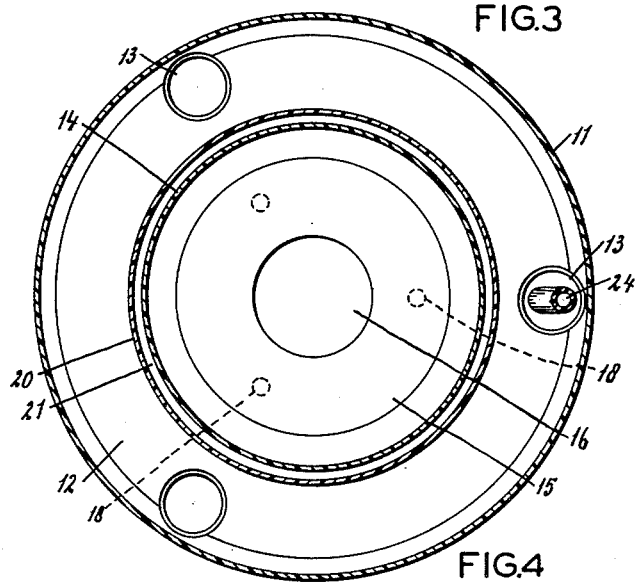

United States Patent Office 3,066,446
Patented Dec. 4, 1962

3,066,446
DEVICE FOR CULTIVATING PLANTS
Paul Buttinger, 13 August Janssenweg,
Baarn, Netherlands
Filed Apr. 23, 1959, Ser. No. 808,509
Claims priority, application Netherlands Apr. 25, 1958
10 Claims. (Cl. 47—38)

The invention relates to a device for cultivating plants, and in particular to a device of this kind wherein water is automatically supplied to the earth in which the plants are rooted.

For the cultivation of plants, it is not only necessary that the plants get a sufficient amount of water, but there is an additional condition to be satisfied, to wit: that the earth in which the plants are set is sufficiently ventilated.

In the usual flower pots, this ventilation is ensured by making the pot out of a porous material. The earth in the pot is periodically saturated with water, which is subsequently partially evaporated and partially taken up by the plant, whereby the earth is gradually dried. During this drying process, air is sucked in to provide the required ventilation.

However, conditions in such a flower pot are far from ideal. The periodic saturation of the earth with water diminishes the natural porosity of the earth, and the fact that the earth is alternately too wet and too dry impedes the growth of the bacteria required for the metabolism of the plant.

Means have been proposed whereby a controlled amount of water is automatically supplied to the earth in order to keep the same at a substantially constant humidity. However, this makes it impossible to obtain a ventilation through the porous walls of the plant receptacle in the above-described manner. A ventilation by means of compressed air is only practicable in large scale cultivation, for instance in nurseries, and even there, it is generally too complicated and too expensive.

It is an object of the invention to remove the above-mentioned disadvantages of the known devices, and to provide a device for cultivating plants wherein a controlled amount of water is automatically supplied to the earth in which the plants are set, and wherein the required ventilation of the earth is obtained by simple and inexpensive means without the need of using compressed air.

It is another object of the invention to provide a device for cultivating plants, wherein the earth is kept at a substantially constant humidity, and wherein the necessary ventilation of the air is ensured in a simple and inexpensive manner.

Further objects of the invention will appear from the following description of two embodiments thereof, given with reference to the accompanying drawings.

FIG. 1 shows schematically, in cross section, a device according to the invention, wherein the plant receptacle has the general character of a flower box.

FIG. 2 is a plan view of the device shown in FIG. 1.

FIG. 3 shows a cross section of a device according to the invention, wherein the plant receptacle has the general character of a flower pot.

FIG. 4 is a cross section along the line IV—IV in FIG. 3.

FIG. 5 shows a detail of a modification of the device shown in FIGS. 3 and 4.

Referring now to FIGS. 1 and 2 of the drawings, the device shown in the same comprises a plant receptacle 1, formed as a flower box and intended to be filled with earth up to the level indicated by the dotted line 2. A water tank 3 is placed beside the box 1 at a slightly higher level, and is provided with a feeding channel 4 communicating with the tank through an opening 5 near its bottom. An air conduit 6 communicates with the tank 3 near the closed top of the same and is connected at its other end with a perforated horizontal tube 7 placed in the box 1 at some distance from the bottom, but below the earth level 2. A water conduit 8 communicates with the tank 3 near its bottom and is connected at its other end with a horizontal tube 9 placed in the box 1 at a lower level than tube 7. The tube 9 is water pervious, i.e. it is either perforated, or made of a water pervious material. A cock 10 in the conduit 8 serves to control the amount of water supplied from tank 3 to box 1.

The operation of this device is as follows. Water is poured into tank 3 through feeding channel 4. The air in tank 3 is pressed through air conduit 6 into tube 7, and passes through the earth in box 1 into the atmosphere. Water from tank 3 flows through conduit 8 into tube 9, and passes through the water pervious walls of this tube into the earth in box 1. When the water level in box 1 reaches tube 7, the passage of air through the perforations or tube 7 is cut off. As the water level in box 1 rises further, a vacuum is built up above the water level in tank 3, until an equilibrium is reached and the water level in box 1 remains stationary. The water in box 1 is now consumed by the plants set in the earth, so that the water level drops, and after some time, the perforations of tube 7 are again free to pass air. As a vacuum still persists above the water level in tank 3, air is now sucked in through the earth in box 1, and through tube 7 and conduit 6, whereby the water supply from tank 3 to box 1 is restored, the water level in box 1 rises again to cut off the air passage through tube 7, and the process is repeated. Thus, it will be seen that air passes through the earth in box 1 when the tank 3 is filled, and each time when air is sucked in through conduit 6, whereby an effective ventilation of the earth is ensured.

In the embodiment shown in FIGS. 3 and 4, the plant receptacle and the water tank form an integral unit, which may be made of any suitable material, such as glass, polystyrene, polyvinyl chloride, or the like. This unit is enclosed by an outer envelope which is open at the top, and has a frustoconical side wall 11, a flat bottom 12, and three hollow feet 13. The plant receptacle is formed by an inner envelope having a frustoconical side wall 14, a flat bottom 15 provided with a central opening 16, and a horizontal flange 17 at the top. The inner envelope is spaced at a slight distance from the bottom 12 of the outer envelope by means of suitable spacing elements 18. The horizontal flange 17 is joined with the side wall 11 of the outer envelope in an air-tight manner. For instance, if the unit is made of a thermoplastic material, this air-tight joint may be obtained by means of a suitable adhesive, or by high frequency sealing. The inner envelope is further provided with a raised annular collar 19, which forms, together with the horizontal flange 17, and the side wall 11 of the outer envelope, a so-called water ring, serving to keep the atmosphere above the plant receptacle at a suitable humidity.

A frustoconical wall 20 is coaxially arranged around the side wall 14 of the inner envelope, so as to leave a narrow passage 21 between them. A ring 26 formed on the bottom 12 of the outer envelope encloses the lower edge of the wall 20 so as to form a water-tight seal. Openings 22 are provided in the wall 20 near the lower edge thereof; each of these openings is closed by means of a wad 23 of cotton, felt or a similar material, so as to allow for the passage of water, but to prevent the passage of air. The wads 23 may be attached to the wall 20 by means of a suitable adhesive. The space enclosed between walls 11 and 20 serves as a water tank. Feeding tubes 24 extend from the water ring between wall 11 and collar 19 into the feet 13.

The operation of the device shown in FIGS. 3 and 4 is substantially the same as that of the device shown in FIGS. 1 and 2. Water is pored into the water ring, and flows into the water tank through the feeding tubes 24. The air in the water tank is pressed through the passage 21 between walls 14 and 20, and passes into the atmosphere through the opening 16 and the earth in the plant receptacle. Water flows from the water tank into the plant receptacle through the openings 22, and cuts off the air passage through channel 21, so that a vaccum is formed above the water level in the water tank. As the water in the plant receptacle is consumed by the plant or plants, the air passage is again set free, whereby air is sucked in through the earth in the plant receptacle.

In the modification shown in FIG. 5, the bottom 15 of the inner envelope has been omitted. A disc 25 made of a porous material, such as felt, serves to obtain a suitable distribution of the water flowing in from the water tank. A water-tight seal between the wall 20 and the bottom 12 of the outer envelope is obtained by pressing the wall 20 into the porous disc 25.

Although the invention has been described hereinbefore by reference to some specific embodiments thereof, it is to be understood that the invention is not restricted thereto, and that many modifications and alterations are possible within the scope of the invention as set forth in the appended claims.

I claim:

1. A device for cultivating plants, comprising a plant receptacle intended to be filled with earth, a water tank closed at its top, at least one feeding conduit communicating with said water tank near the bottom of the same, an air conduit leading from the top of said water tank to the bottom of said plant receptacle and communicating with the ambient air exclusively through earth in said receptacle and a water conduit leading from the bottom of said water tank to the bottom of said plant receptacle said closed top water tank serving to entrap air above water contained therein when the end of said air conduit in the bottom of said plant receptacle is blocked by water, whereby, as water leaves said tank through said water conduit to enter earth in said plant receptacle, said air is reduced in pressure to impede the flow of water through said water conduit to said receptacle, and said water flow resuming as a result of a consumption of water in said receptacle sufficient to unblock said air conduit to allow air to flow through said earth and air conduit to said water tank.

2. A device as claimed in claim 1, further comprising a first horizontal tube extending through said plant receptacle below the earth level, provided with perforations, and connected with said air conduit, and a second horizontal tube extending through said plant receptacle at a lower level than said first horizontal tube, and connected with said water conduit, the said second horizontal tube being water pervious.

3. A device as claimed in claim 1, further comprising a cock in said water conduit for controlling the water supply from said water tank to said plant receptacle.

4. A device for cultivating plants, comprising a plant receptacle intended to be filled with earth, a water tank closed at its top and surrounding said plant receptacle, at least one feeding conduit communicating with said water tank near the bottom of the same, an air conduit leading from the top of said water tank to the bottom of said plant receptacle, and communicating with ambient air exclusively through earth in said receptacle and a water conduit leading from the bottom of said water tank to the bottom of said plant receptacle.

5. A device as claimed in claim 4, comprising an outer envelope having a frustoconical side wall and a flat bottom, an inner envelope having a frustoconical side wall and a horizontal top flange attached with its peripheral edge to the side wall of said outer envelope in an airtight manner, and an additional frustoconical wall coaxially enclosing the side wall of said inner envelope and supported by the bottom of said outer envelope in a watertight manner, the said plant receptacle being formed by said inner envelope, the said water tank being bounded by the side wall of said outer envelope, said additional wall and said top flange, and the said air conduit being bounded by the side wall of said inner envelope and said additional wall.

6. A device as claimed in claim 5, wherein the said water conduit is formed by at least one opening in said additional wall closed off by means of a wad of water pervious material.

7. A device as claimed in claim 5, wherein said inner envelope has a flat bottom with a central opening spaced with respect to the bottom of said outer envelope by means of at least one spacing element.

8. A device as claimed in claim 5, wherein a disc of a porous material is placed on the bottom of said outer envelope, and said additional wall is pressed with its lower edge into said disc.

9. A device as claimed in claim 5, wherein said inner envelope is provided with a raised collar defining a water ring together with said top flange and the side wall of said outer envelope.

10. A device as claimed in claim 5, wherein said outer envelope is provided with a plurality of hollow feet, and the said feeding conduits extend into the said hollow feet.

References Cited in the file of this patent

UNITED STATES PATENTS

| | | |
|---|---|---|
| 179,558 | High | July 4, 1876 |
| 267,296 | Wilder | Nov. 7, 1882 |
| 1,117,474 | Benning | Nov. 17, 1914 |
| 2,062,755 | Lyons | Dec. 1, 1936 |
| 2,084,005 | Richards | June 15, 1937 |
| 2,183,970 | Meissl | Dec. 19, 1939 |
| 2,198,150 | Barnhart | Apr. 23, 1940 |
| 2,241,699 | Cooper | May 13, 1941 |
| 2,288,678 | Blumentritt | July 7, 1942 |
| 2,803,091 | Radford | Aug. 20, 1957 |

FOREIGN PATENTS

| | | |
|---|---|---|
| 22,840 | Great Britain | Nov. 28, 1893 |
| 14,554 | Great Britain | June 24, 1907 |